May 25, 1965  G. GEMBE  3,185,411
MULTIPLE CELLED AIRSHIP
Filed March 22, 1962  6 Sheets-Sheet 6
Fig. 16
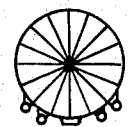 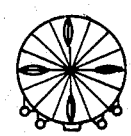
Fig. 17  Fig. 18
Fig. 19
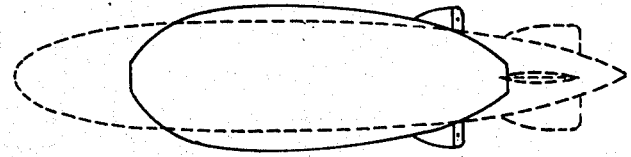
Fig. 20
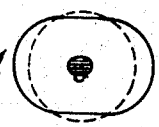 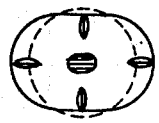
Fig. 21  Fig. 21a

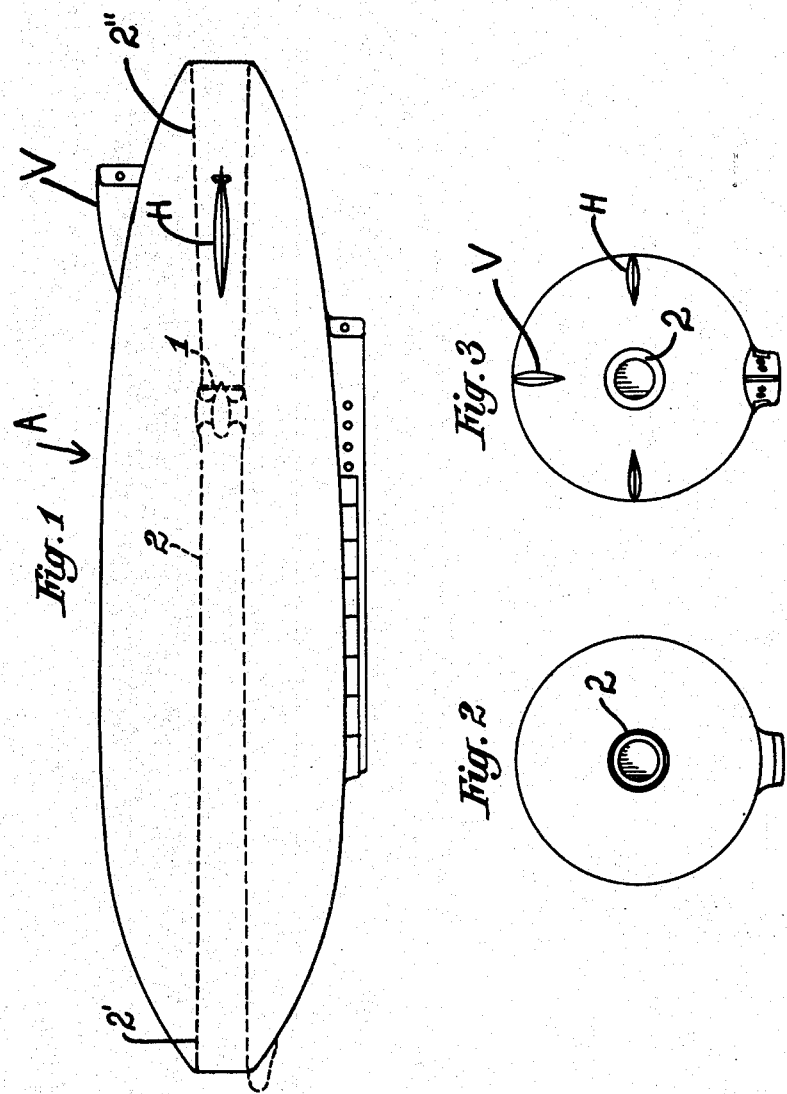

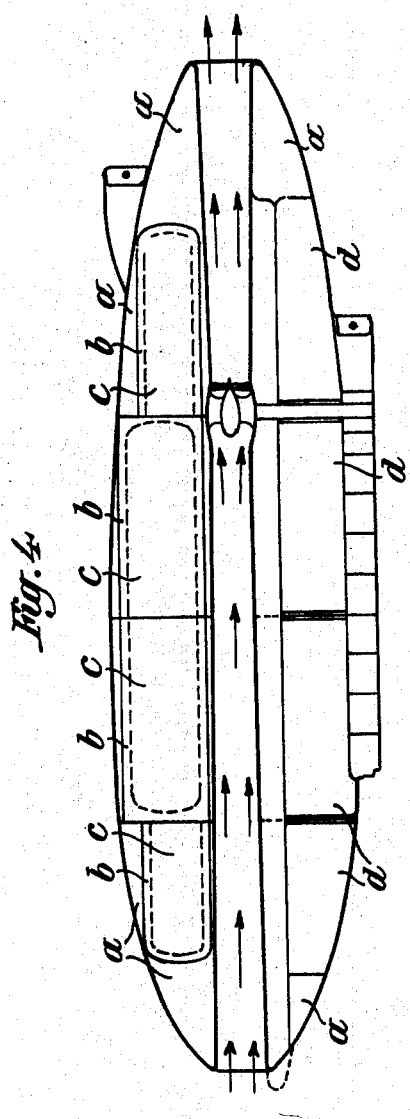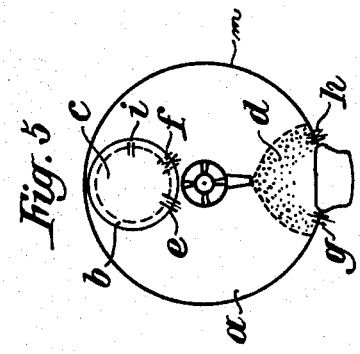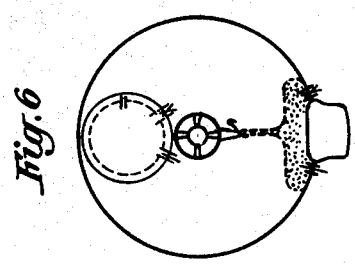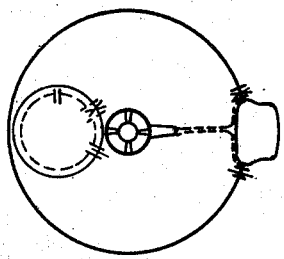

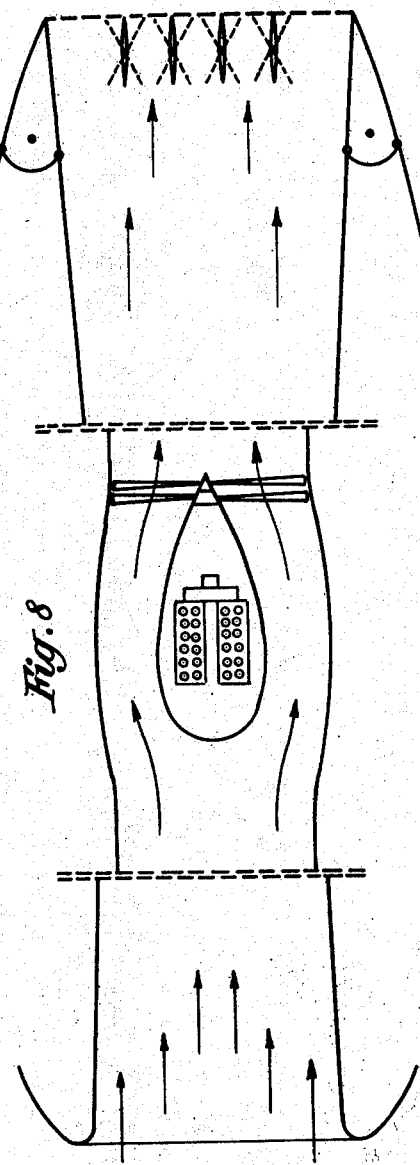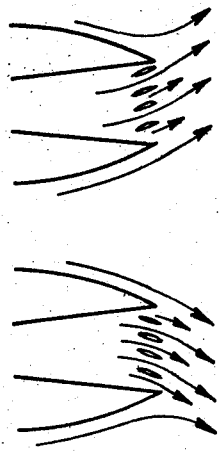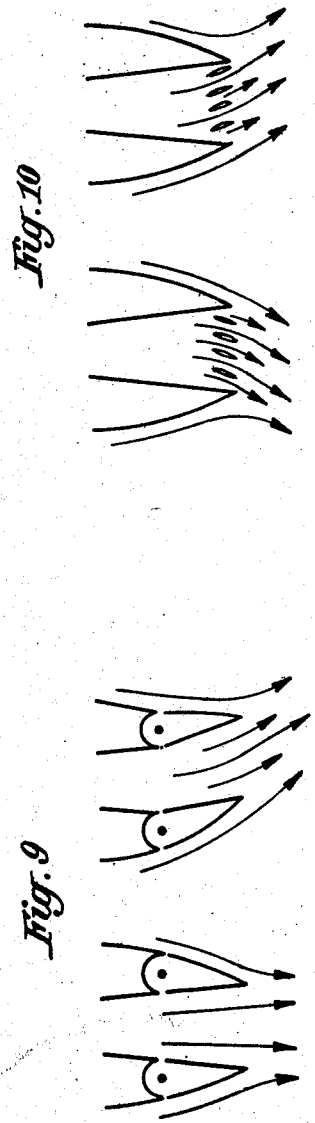

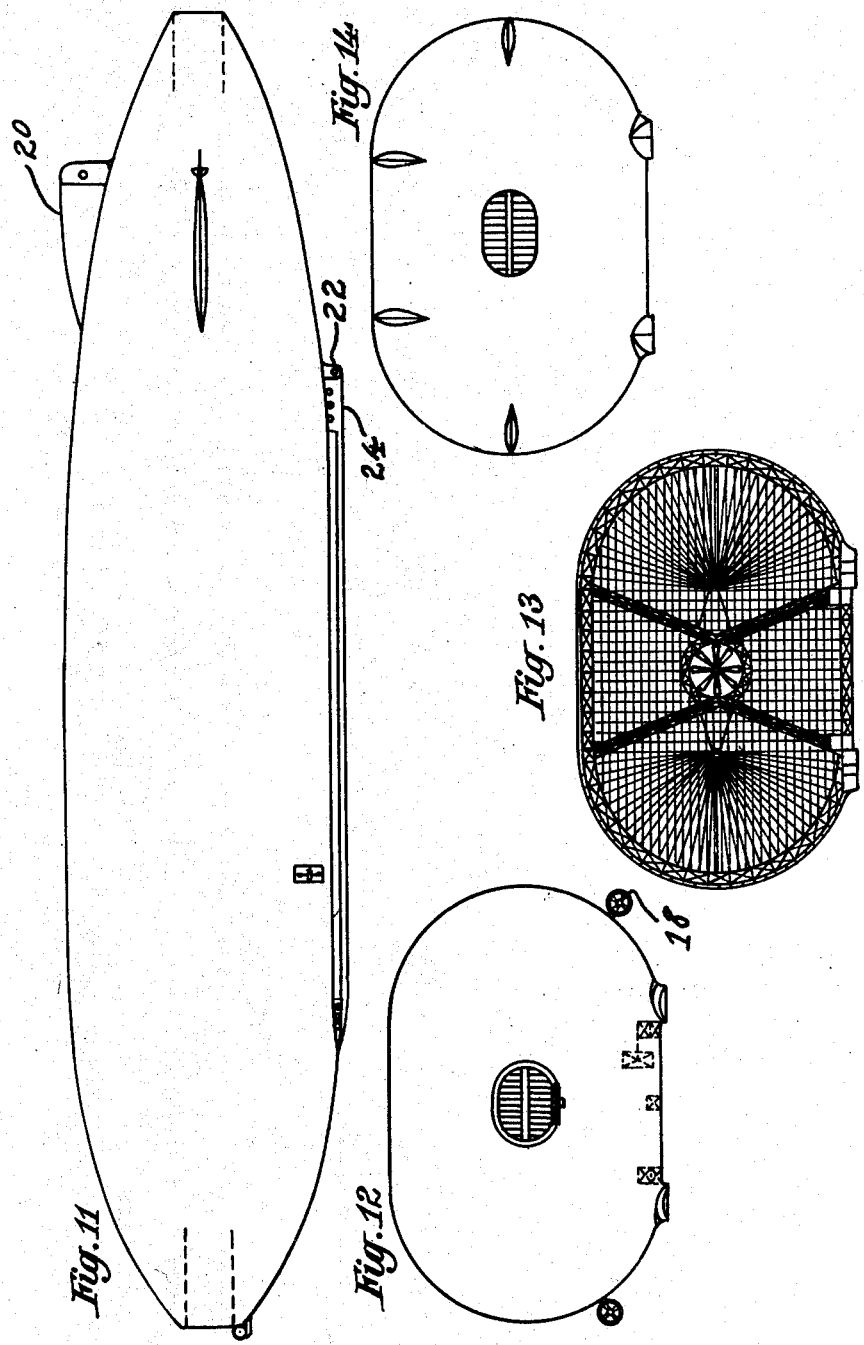

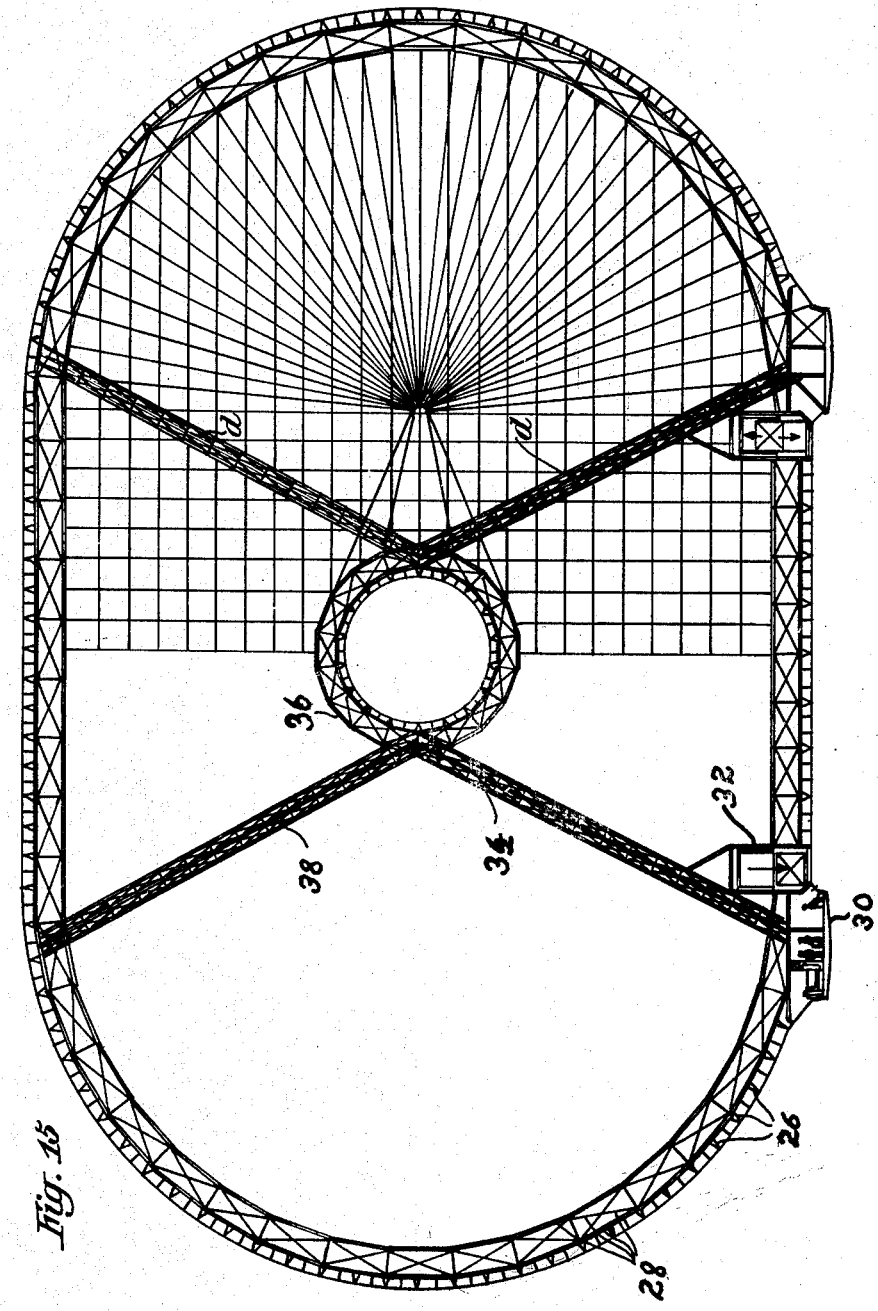

United States Patent Office 3,185,411
Patented May 25, 1965

3,185,411
MULTIPLE CELLED AIRSHIP
Gerhard Gembe, Konigsteinerstr. 200,
Frankfurt am Main Hochst, Germany
Filed Mar. 22, 1962, Ser. No. 182,719
Claims priority, application Germany, Mar. 22, 1961,
K 43,266
6 Claims. (Cl. 244—30)

The present invention relates to semirigid or rigid aircraft.

It is an object of the invention to provide an improved aircraft which is distinguished from known aircrafts by increased safety while avoiding to the greatest possible extent disadvantages such as economical increases in weight. The invention not only eliminates safety defects, but also takes into consideration other essential problems of airship construction.

One of the basic facts to be noted is that known non-rigid and rigid airships have a number of technical, operational and economical disadvantages. These are mainly the following:

(1) Limited structural order of magnitude and useful load,
(2) Comparatively low speed, namely, about 50 miles per hour for non-rigid airships and a maximum of 80–87 miles per hour for rigid airships and a correspondingly low useful or pay load over long flying distances,
(3) (a) No climbing without reduction of ballast and no descent without load loss and, hence,
(b) No unlimited starting and landing without replenishing water ballast and lifting or buoyant gas,
(c) Very great difficulty in maintaining a specific flight altitude in case of fluctuations in temperature,
(d) Taking along of special ballast,
(e) High loss of buoyant gas with each flight,
(f) Clumsy maneuverability,
(g) Steering or control disadvantages,
(4) High expenditure of personnel on board and in the ground organization.
(5) Limited profitableness.

The above-mentioned disadvantages, taken together, would appear to have been sufficient reason why the construction of rigid airships was not resumed after World War II.

In view of the disadvantages enumerated above, it would not be appropriate, if not entirely impossible, to work out as perfect a solution as possible by starting from the previously known, conventional airship designs, an apparently obvious solution, and to try to propose individual measures relating to technical improvements. Instead, the invention solves the various problems by creating novel aircraft constructions differing from conventional design by a combination of functionally cooperating technical measures, whereby said novel aircraft constructions avoid the above enumerated disadvantages of the conventional airships and take into account all modern requirements. It is, therefore, proposed, to replace non-rigid airships still in operation and which especially do not meet safety demands, a novel semirigid aircraft construction and, instead of the conventional rigid airships, a novel rigid aircraft construction corresponding to said novel semirigid aircraft construction. Said novel rigid type is to have primarily a much higher gas content and a much higher pay load than was possible in conventional designs. Both constructions are to guarantee much greater safety than previously known airships, are to have substantially higher speeds of about 75 miles per hour for the semirigid type and 186 to 249 miles per hour for the rigid type, shall be able to climb without requiring water ballast and be able to descend without loss of buoyant gas, shall be able to maintain any flight altitude desired even when atmosphere conditions change, shall be easier, quicker and more economical to maneuver, shall require less personnel on board and on the ground and shall be altogether more profitable.

The novel aircraft constructions according to the invention shall have, grosso modo, a compact elliptical shape in case of the rigid airship and a novel framework construction for semirigid and rigid airships with an airduct drive at the center of drag. The invention will permit of structural orders of magnitude and pay loads of a degee that was previously technically impossible. These features simultaneously increase substantially stability and thereby the safety. Also contemplated is a novel aerodynamic shape with completely smooth form and surface with an arrangement of longitudinal girders and transverse girders including displacement of the drive into the center of drag to obtain, despite substantially larger sizes, considerably higher speeds than with previously known designs. The displacement of the motive drive into the interior of the airship allows continuous maintenance and even repairs in flight and thereby substantially improves safety conditions.

A novel buoyant gas/air system forms a functional supplement. This renders possible, in addition to improved safety by subdivision of the gas volume, an easier, quicker and better maneuvering as required for higher speeds, especially for the climbing and descending of the airship without taking along special water ballast and without loss of buoyant gas. At the same time, it permits maintaining any desired altitude.

This maneuverability, which must be improved because of the increased speeds, is further functionally supplemented by a jet deflection control which is novel in airships. This novel control serves for relieving the elevators and rudders, so that same can be developed substantially simpler and aerodynamically more favorably without the bracings which were heretofore necessary, especially in non-rigid airships, thereby additionally promoting higher speeds.

The following details are to be noted:

As compared to previously known airships of non-rigid design, it is the primary object of the invention to create an absolutely safe airship, while also avoiding the additional disadvantages enumerated above. The invention attains this object by more than mere individual improvements of a non-rigid airship of conventional design. The main disadvantage with respect to safety in such a non-rigid airship consists in that the envelope as the main load carrier has to absorb substantially all compressive and tensile forces. This is a considerable disadvantage for the necessary stability and safety of the airship. By its very nature, the envelope is susceptible to leaks. Moreover, because of the lack of subdivision of the gas volume into separate gas chambers, there is a constant danger of total loss in case of a leak.

The invention proposes to avoid these safety defects by the three following functionally cooperating features of a novel, semirigid construction:

(1) The non-rigid airship hull is stabilized by an airduct drive frame extending from the bow to the stern and preferably widening toward the two ends, and stabilized in such a manner that it completely replaces the envelope as the main load carrier (which it was in the past) and takes charge of all essential compressive and tensile stresses. The envelope now only serves as a gas container and is therefore under substantially less stress and is substantially less trouble prone. This construction permits at the same time to displace the drive into the interior of the ship adding another safety feature, because it permits of easier and continuous servicing of the motive drive including repairs even during the flight.

(2) The relief of the envelope is supplemented by the subdivision of the gas volume by a novel buoyant gas/air system into individual pairs of gas and air cells arranged vertically in longitudinal direction. This subdividing makes the airship safe, in case of leaks against total loss. In case of leaks, only one subdivided chamber can be affected, and a collapse of the hull will be avoided by the frame, so that there always remains an airworthy hull.

(3) A jet deflection control or steering mechanism serves further to relieve the envelope and to reduce its susceptibility to trouble in that it replaces the elevators and rudders, heretofore fixed to the envelope by special bracings, as control elements.

The property of the three above-mentioned features as cooperating safety factors is only one effect. In addition thereto, they serve to fulfill other tasks, in order to eliminate the above-enumerated disadvantages of prior airship constructions and to obtain better technical, operational and economical results.

Thus, the effect of the air-duct drive as a safety or stabilizing factor is only one of several effects. Its main importance resides in its favorable aerodynamic value for reducing the air resistance or drag as well as of increasing the motive performance or output. In previously known constructions, the motive force was suspended in several engine nacelles outside the hull by means of steel cables and struts. This construction was aerodynamically disadvantageous, but no better solution has been found to date.

According to the invention, a characteristic feature resides in displacing the drive in the form of an air-duct drive into the interior of the airship, namely, at the center of drag. In this central drive, the propellers suck in the air through the intake opening of an air duct disposed at the bow. The masses of air receive a substantial acceleration until they reach the propellers, which force them through the discharge opening at the stern into ambient atmosphere thereby imparting the necessary drive to the airship.

Known constructions, especially the non-rigid designs, also had a disadvantageous pitching or tilting moment placing the airship with its nose in an upwardly inclined position, because the drive acted below the point of attack of the air resistance or drag. In order to compensate this pitching or tilting moment, a special motive power was required in the past. In the present construction, on the other hand, the air masses moved by the central drive lend to the airship hull the property that the airship flies smoothly and without tilting motions, so that it is unnecessary to expend special motive forces for avoiding said tilting motions as had to be done in the past.

The installation of the central drive reduces the drag of the cross-sectional area of the airship hull at the bow by about 16% of the intake opening size.

In addition to the various advantages of reducing drag and of avoiding pitching or tilting moment, two further advantages of said air-duct central drive are especially to be stressed:

The first special advantage, already mentioned above in another connection, is the reduction of the drag by the elimination of the outer engine nacelles, which is substantial.

Another special advantage is the increase in motive power which is effected by the sheathed propeller. According to the theory of Prof. Dr. Lippisch (in Aero No. 6/1960, page 130), a gain of about 30% can be obtained compared with a propeller without sheathing, and experimental results actually show about twice as much gain in thrust.

Another reduction of the drag is caused by the jet deflection control. In previously known non-rigid airships, the envelope including the elevators and rudders were subjected to special stress as main load carriers. Consequently, the elevators and rudders had to be secured by special reinforcing bracings with the envelope. These reinforcing bracings naturally had an adverse influence on the drag of the airship. The jet control substantially relieves the elevators and rudders. They no longer have to fulfill steering tasks, but only serve to a certain degree to stabilize the airship hull. Owing to the substantially smaller stress, the bracings may be dispensed with entirely.

It can be stated that the air-duct drive and the jet control, by increasing the motive power and decreasing the drag, make it possible to fly at higher speeds than was possible in the previously known airship constructions of conventional design.

The possibilities of higher speeds are not impaired by the increase in weight caused by the additional air-duct framework which did not exist in the conventional non-rigid design, because this additional weight is compensated by savings in weight at other places, namely:

(a) By the elimination of the engine nacelles as well as their bracings and struts, (b) By the relief of the envelope as main load carrier so that the envelope can be constructed much lighter; more particularly, the reinforcements at the bow can partly be omitted;

(c) The increased motive power of the sheathed propeller results, by itself, in a substantial saving in engine weight, (d) To this must be added a corresponding saving in fuel, (e) The elimination of the engine nacelles and the displacement of the drive into the interior of the airship results in an easier operation and consequent reduction of crew personnel.

The above mentioned higher speeds would not be made possible solely by the air-duct drive and the jet deflection or diversion control or steering, if the novel buoyant gas/ air system, beyond the above-mentioned increased safety of the airship caused by the subdivision of the gas volume, would not permit of better maneuverability of the airship corresponding to said higher speeds.

It was previously impossible to climb without water ballast and to descend without loss of gas. Consequently, special ballast water had to be carried along, and each flight caused substantial losses of buoyant gas, which was of great economic importance when expensive helium was used as the buoyant gas. This maneuvering operation was, moreover, very cumbersome and unsuitable for higher speeds. In the past airships, when being made ready for starting, were weighed out with an amount of water ballast corresponding to the destination or the duration of the flight. In order to climb, water ballast had to be jettisoned, and in order to descend, buoyant gas was blown into the free air space by means of maneuvering valves. This process is to be changed, according to the invention, in that air is now used as ballast instead of water. This "ballast air" is stored in special air cells in the lower portion within the envelope. Such special air cells existed heretofore in non-rigid airships as so-called "air balloonets." However, they merely served the purpose of balancing, by the admission or discharge of air, changes in volume of the buoyant gases in case of diffusion or in case of temperature fluctuations or in case of changes in atmospheric pressure when climbing or descending. Said "air balloonets" are additionally to serve, according to the invention, as "ballast air" cells. For this purpose, they are additionally provided with a maneuvering valve acting as a connection to the atmosphere. The invention further provides, as additional new elements, special buoyant gas cells in the top portion of the gas envelope. Said cells are, in turn, in communication with the buoyant gas contained in the general gas volume by maneuvering valves and blowers. The arrangement of the gas/air cells causes the vertical subdivision, discussed above in connection with the safety question, of the gas envelope into a number of mutually independent gas air cell pairs. The buoyant gas contained in the special lifting cells is under a comparatively low excess pressure corresponding to the strength of the envelope.

The climbing and descending of the airship takes place in the following manner:

The maneuvering valves of the special gas cells are opened so that the pressurized buoyant gas flows into the general buoyant gas chamber, generates an excess pressure therein and thereby presses air from the "ballast air" cells into the free air. The buoyant gas expands accordingly and thereby effects buoyancy for a climb. During the climbing of the airship, the atmospheric pressure decreases continuously, so that the buoyant gas correspondingly expands continually. The airship thus continues to climb until the expensibility of the buoyant gas is exhausted, which is the case when the "ballast air" cells are pressed empty by the expansion of the buoyant gas.

For the descent, the blower presses buoyant gas from the general gas volume or chamber into the special gas cells and, at the same time, through the corresponding blower, air from the free air space into the "ballast air" cells, namely, for the two-fold purpose of preserving the stretched form and as ballast.

The buoyant gas/air system can be improved further and, above all, made still safer by arranging about the special excess-pressure gas cell a second special gas cell, which is connected to the first excess-pressure cell inside it by a valve. This improved device has the following importance:

Even the densest gas cell or gas bag material is gaspervious, so that it must be expected that gas diffuses through the excess-pressure cell into the general gas volume causing undesirable effects. In order to avoid this, the excess-pressure cell is surrounded with another cell in such a manner that gas diffusing from the excess-pressure cell is automatically pressed back again into the excess-pressure cell through a valve.

The airship equipped with a buoyant gas/air system according to the invention is thus able, without carrying along special water ballast, to climb and descend without loss of buoyant gas, as often as is necessary or desirable. A ballast or buoyant gas supplement, as required in the past, is no longer necessary. The climb and descent can be controlled automatically from one place, namely, in such a manner that the control can be effected separately for each gas/air cell combination, so that it is possible to regulate, for example, bow and stern weight independently of each other if desired or required. The system thus makes it possible to maintain any desired altitude, even when the atmospheric conditions change or the temperature fluctuates. This is chiefly important in tests at certain altitudes as well as especially necessary in starting and landing operations. In the previous cumbersome method of climbing and descending by dropping jettisoning water ballast and buoyant gas, special difficulties were encountered in the landing operation, the heading for the mooring mast or the SL-shed, for example, in the case of suddenly changed ground temperatures, and this, accordingly, required a special maneuvering skill on the part of the commander. Above all, this necessitated numerous skilled ground or handling crews under expert guidance, in order to ensure a flexible handling on starting and especially on landing. More particularly, this had the importance of avoiding losses of water ballast and buoyant gas which were uneconomical or not possible for lack of sufficient supplies during landing operations.

The above will now be explained by way of an example:

An airship might be unable to head for a mooring mast of about 50 meters height at the same height of 50 meters, because there was the danger that even a minor variation in ground temperature would force the ship to the ground, and this could not be prevented because of the impossibility of maneuvering with sufficient speed. Consequently, an airship, especially a big one of, e.g., 200,000 cubic meters, had to approach at a height of about 250 meters with about a 2% lift, a mooring line would then be thrown out for the ground crew to enable carrying out the last descending motion with the help of said ground crew. The latter would thus serve as ballast with a pull, corresponding to the lift, of about 4 tons and would pull the airship down to the height of 50 meters. The influence of variations in ground temperature on the lift was thereby compensated by human power of ground or handling crews. Of course, theoretically, a compensation by jettisoning water ballast would have been possible, provided there was still a sufficient amount thereof. But at a height difference of only 80 to 100 meters, this would have meant a 1% loss of lift and hence 2 tons of water ballast which would then have to be balanced again by a corresponding jettisoning of buoyant gas. On the one hand, in the case of expensive helium as buoyant gas, this would be uneconomical and, on the other hand, this might be impossible for lack of sufficient supplies, for example, in case of the necessity of repeated maneuvering.

These disadvantages are avoided in the buoyant gas/air system of the invention, since there are no losses of ballast and buoyant gas, i.e., both are present in sufficient amounts. Moreover, this system can function more quickly and more safely by way of an automatic electronic system and fully meets the requirements of flexible handling, so that ground crews become unnecessary. The economic importance becomes apparent from the following figures: The airship "Graf Zeppelin" with a gas content of 105,000 cubic meters had a loss of gas of about 5000 cubic meters on each flight. The airship "Hindenburg" which was about twice as big, lost twice the amount of gas. The invention avoids these losses.

Further, the maneuverability, which is improved substantially by the above system, is further substantially promoted by the jet deflection control.

Previously known airships had necessarily comparatively large elevator and rudder surfaces corresponding to the great stress. For the purpose of steering, the control surfaces were turned counter to the direction of flying, so that the air current striking them pressed the airship laterally into the desired course. In addition to the size, another disadvantage consisted in that the driving power went only in one direction. The process of the invention avoids these disadvantages. According to this process, the driving jet of the central drive is deflected by guide surfaces at the stern and/or in the stern opening of the airship, both laterally and upwardly and downwardly. Steering by elevators and rudders is thus replaced. However, the horizontal and vertical stabilizers are not to be omitted completely, but will be used, although no longer for steering, for stabilizing the hull. For this purpose, a smaller, weight-saving construction of the stabilizers is sufficient. Owing to the large control surface, the previous known steering control was naturally much more clumsy than the system proposed according to the invention which has comparatively much smaller control surfaces. The new system thus allows a steering operation with less expenditure of energy.

As already mentioned above, the additional weight of the air-duct frame is compensated by other savings in weight. The elimination of the water ballast for purposes of maneuvering and the reduction of water ballast producing plants, as well as the elimination of the gas heating installation weighing, for example, 200 kg. in a 30,000 cu. m. airship, produce a saving, which also compensates the weight of the additional special gas cells.

The saving resulting from the elimination of the elevator and rudder bracings, the diminution and corresponding reduction in weight of the elevators and rudders will compensate any increase in weight.

The advantages of the three above-described features and of their cooperating functions apply, according to the invention, in a corresponding manner also to a rigid airship, but are advantageously supplemented by three additional features. These supplemental features relate to the increase of the structural size and of the pay load, as well as to the better aerodynamic design for increasing speed.

Although the possibilities of structural size in the above described semirigid construction are greater, because more stable, than in the non-rigid airship of conventional design, they are still limited by the fact that the elastic envelope, although reinforced by the air-duct drive frame, still has a more limited resistance than, for example, that of a rigid airship.

The situation in a rigid airship is the following:

As mentioned above, the biggest "Zeppelin" airship constructed had a content of 200,000 cu.m. The biggest rigid airship planned was to have a content of 280,000 cu.m. The latter construction was, in essence, only longer and thicker than the biggest "Zeppelin" as conventionally constructed.

Such conventional increases of the structural size are also very limited because, with increasing length and thickness of an airship of conventional design, the stresses also increase and the major portion of the gas buoyancy gained is lost by the weight of the framework or skeleton that has to be strengthened correspondingly. In addition, the maneuverability of such hulls becomes more and more difficult with increasing length. Moreover, the drag coefficient of the above mentioned conventional airship constructions is not particularly favorable. Consequently, the recipe to construct longer and thicker ships does not produce very good results in the construction of airships. A very different result is obtained by proceeding from other than a conventional round shape, which is more particularly made possible by the combination or cooperation with the three above described features. According to the invention, the shape of the airship body or hull is so selected that it has the smallest possible length and the greatest possible gas volume content while maintaining a favorable streamlined shape. This will be the case if the known aerodynamically favorable, round airship body or hull is widened by a rectangular center piece on a body having an elliptical cross section. This widening permits to maintain the most favorable streamlined shape, but the gas volume will be increased fourfold while the length remains the same. In other words, with the gas volume being the same, the construction according to the invention is substantially shorter and comparatively only little wider. By way of comparison, a known airship having a content of 200,000 cu.m. had a length of 245 meters and a diameter of 41.2 meters whereas the construction according to the invention requires for the same gas volume of 200,000 cu.m. only a length of 150 m., a width of 57 m., and a height of 38 m.

This produces the following special advantages:

(a) At a length-to-thickness ratio of 5:1 (calculated after deducting an air-duct cross section of 6 m. plus 60%), the drag coefficient with cw.=0.04 is more favorable than in a conventional airship having a length-to-thickness ratio of 6:1.

(b) This means a saving of driving power, and corresponding saving in weight, of one-third. However, this saving is at least partly offset by the larger elliptical cross section (in the example: abt. 1860 sq.m. for the elliptical cross section as compared with abt. 1330 sq.m. for the round one). But even, in the most unfavorable case, about the same driving power is required in both instances, this would be a substantial advantage for the invention because of the proportionately much larger gas volume (as well as the above-described advantages resulting from the other features).

(c) The outer envelope required for the gas volume is substantially smaller, namely abt. 18,900 sq.m. instead of 24,000 sq.m.

(aa) The immediate advantage resulting therefrom is a substantial saving in the weight of the envelope. The saving in weight according to (c) is 24,000—18,900= another 20%.

(bb) Corresponding to the small outer envelope, the weight of the framework or skeleton is naturally less.

(d) The maneuvering of a short compact body (having a length of 150 m. according to the example) is naturally easier than that of a long airship hull (having a length of 245 m. according to the example).

(e) The substantial saving in envelope and framework weight permits, in addition to the above mentioned increase resulting from the driving power and from the reduction of the drag, correspondingly to increase the speed owing to reduced surface friction. Two further supplemental features also serve to increase the speed, namely:

(5) According to the invention, the outer envelope shall, unlike the conventional method, consist not of fabric, but of a light metal or of another smooth material of higher resistivity than heretofore (for example, beryllium). This substantially reduces the frictional resistance, because the surface is not crushable to the same extent as the previously used cloth and is, above all, immune to moisture. It is important, not the least for reasons of weight that the envelope is immune to moisture, whereas the previously used fabric envelopes had the unpleasant property that they strongly absorbed atmospheric moisture, thereby became substantially heavier during operation and had to be dried after each flight. Moreover, the buoyant gas absorbed moisture through the wet envelope and thereby lost some of its lifting force.

(6) The longitudinal girders are arranged, unlike the conventional arrangement, above the transverse girders; this limits the drag only to the longitudinal direction, whereas the drag in the previously known inverse arrangement acted both in longitudinal direction and in transverse direction.

All of the various features cooperate advantageously to make it possible to obtain the technical effects intended to be produced by means of the invention.

The elliptical construction is the best possible one for the air-duct drive because of the high gas content, and the only possible one in the case of big airships. It would result owing to loss of gas volume and additional structural weight in a reduction in pay load of at least 15%. On the other hand, the loss of gas volume and the additional structural weight of the air-duct drive are more than compensated in the elliptical design by the substantially higher gas volume.

Also, for reasons of stability and safety, the elliptical design is unthinkable without the air-duct drive frame described under (1) above.

The advantages pertaining to speed can be obtained only in functional cooperation with the above-described buoyant gas/air system and the jet deflection control, since the previous clumsy maneuvering operation (climbing with jettisoning water ballast and descent with loss of buoyant gas) as well as elevator and rudder control are unsuited for higher speeds.

Especially, the cooperation of the above-described features permits to construct optimal large-size airships with pay loads which were unobtainable with the previously known conventional rigid airship designs.

Advantageous embodiments of the invention will now be described by way of the accompanying drawings, in which:

FIG. 1 is a side view of a semirigid airship according to the invention provided with central longitudinal duct;

FIG. 2 is an end view of the structure of FIG. 1 seen from the left;

FIG. 3 is an end view of the structure of FIG. 1 seen from the right;

FIG. 4 is a longitudinal sectional view through an airship according to the invention, in which the novel buoyant gas/air system is provided;

FIG. 5 is a cross sectional view, approximately in the center, through FIG. 4 with a maximally filled air cell in the buoyant gas/air system;

FIG. 6 shows the same section as FIG. 5 with half-filled air cell;

FIG. 7 shows the same section with empty air cell;

FIG. 8 shows diagrammatically a section through the longitudinal duct of the airship with the jet deflection control according to the invention in position for rectilinear flight;

FIG. 9 diagrammatically shows, on a smaller scale than FIG. 8, another development of the control device in horizontal flight and deflected position;

FIG. 10 diagrammatically shows a third embodiment of the control device in both deflected positions;

FIG. 11 is a side view of a rigid airship according to the invention;

FIG. 12 shows the same from the front;

FIG. 13 shows a center cross section through same;

FIG. 14 shows the same from the rear;

FIG. 15 shows the subject matter of FIG. 13 on a greatly enlarged scale; and

FIGS. 16–21 show a comparison between the known airship LZ–130 and a rigid airship according to the invention;

FIGS. 16–18 showing the LZ–130 from the side, from the front and from the rear respectively; and FIGS. 19–21a showing a comparative outline of the LZ–130 and an airship according to the invention from the side, from the top, from the front and from the rear respectively, the outlines of the LZ–130 being indicated by a broken line.

The semirigid airship A shown in FIGS. 1 to 3 differs from known airships of the same type in that the driving propeller or propellers 1 are arranged in a central longitudinal duct 2 provided in the airship. Said longitudinal duct preferably widens toward the front and rear openings and thus has leading and trailing flared extremities 2' and 2''. The driving propeller is disposed approximately at the narrowest portion of the duct. As is apparent from the drawing, the duct arrangement permits making the vertical and horizontal stabilizers V and H substantially smaller.

The airship shown in FIGS. 4 to 7 is provided not only with the longitudinal-duct drive according to the invention, but also with the buoyant gas/air system according to the invention, the mode of operation of which is explained with reference to FIGS. 5 to 7. The airship preferably, although not necessarily, has a length to width ratio of about 4–5:1. Said buoyant gas/air system comprises an outer member $m$ defining a general gas volume or chamber $a$, an excess-pressure gas cell $c$ surrounded with an outer compensaitng cell $b$, a ballast-air cell $d$ with deformable walls, a maneuvering valve $e$, a blower $f$, a maneuvering valve $g$, and a blower $h$.

This bouyant gas/air system operates in the following manner:

The major portion of the general gas volume $a$ is filled with the major portion of the buoyant gas; it represents the gas volume causing the lift. The inner gas cell $c$ contains the buoyant gas with 1 or 2% excess pressure, which serves the purpose of increasing the amount of buoyant gas in the general gas volume $a$ and of thereby reducing the volume of the ballast-air cell $d$. The cells $a$ and $b$ are substantially under the pressure of the surrounding atmosphere.

FIG. 5 shows the airship in the state of maximum weight, i.e., with maximally filled ballast-air cell. If the airship, which in this state rests on the ground, is to climb, the pressure release valve $e$ is opened, whereby the buoyant gas flows from the excess pressure cell $c$ into the general gas volume $a$. The pressure in the latter thereby increases and compresses the ballast-air cell $d$, so that the air flows out through the valve $g$ and the airship is thus made lighter by the weight of the escaping air. Since the external atmospheric pressure drops continuously as the airship climbs, a gas excess pressure builds up again and again, so that the cell $d$ from which the air escapes is compressed fruther until it is empty, i.e., until the height of tightness is reached.

For example, if a height of tightness of 1000 meters is to be reached, the ballast-air cell will contain 10% air, since one must count upon a 1% loss of air by expansion of buoyant gas per 100 m. climb. In this case, the general gas volume $a$ and the gas cells $b$ and $c$ contain together 90% buoyant gas plus the additional amount of gas resulting from the excess pressure of 1 or 2% in the inner gas cell $c$, in which the air cell is in the state shown in FIG. 7, if it is desired to lower the airship air is forced from the outside through the blower $h$ into the cell $d$ and, at the same time, buoyant gas is forced through the blower $f$ from the general gas volume $a$ into the inner cell $c$. The volume of the space occupied by the carrying gas is thereby reduced, and the airship starts to descend. The descending process progresses inversely to the above-described climbing process.

The buoyant gas/air system according to the invention preferably provides that the pressure cell $c$ be surrounded with an outer cell $b$ and a blower $i$ is provided which conveys automatically or manually buoyant gas from the space between the walls of the cells $b$ and $c$ into the cell $c$. This makes it possible to prevent buoyant gas from diffusing out of the cell $c$ through its walls and from entering the general gas volume $a$ and to convey said diffused gas from time to time back again into the cell $c$ by means of the blower $i$. This arrangement will be of advantage especially when the pressure-gas cell is not disposed in the general gas volume, but outside of the same.

FIGS. 8 to 10 show a jet deflection control; it consists substantially of a plurality of pivotable control surfaces arranged orthogonally with respect to each other, which, according to the invention, are not mounted outside the airship, but at the rear opening of the central air duct. If these control surfaces are pivoted, they deflect the air masses striking them and forced through the longitudinal duct by the propellers 1 in appropriate direction. The forces of reaction resulting from the impulse change of the air masses thus serve to steer the airship. A special advantage of this arrangement resides in the comparative small size of the control surfaces. Control surfaces at the bow end may also be used, additionally or solely for the control.

FIGS. 8 to 10 show only horizontal stabilizers without vertical stabilizers. In view of the effect of the buoyant air/gas system, vertical stabilizers are normally not necessary, but these may also be constructed in the same manner as the horizontal stabilizers.

FIGS. 11 to 14 show a rigid airship according to the invention, which can be provided, if desired, with conventional externally mounted propellers 18 in addition to the central airduct drive or independently thereof. Said propellers would be developed as so-called sheathed propellers, the substantial advantages of which have already been explained.

Of special importance, however, in the rigid airship according to FIGS. 11 to 14 is the fact that the conventional round cross section is not used and that the airship is given a cross section which is approximately elliptical or which has, more accurately, the shape of a rectangle, over the long sides of which arcs of a circle are superposed. In accordance with this novel, aerodynamically extremely advantageous shape, the airship has not only one upper vertical stabilizer 20, but two. The lower vertical stabilizers 22 are advantageously arranged at the end of the passenger car 24. This airship is also equipped with the advantageous longitudinal-duct drive. The longitudinal duct or, more accurately, the frame carrying said duct serves, exactly as in the semi-rigid airship, to stabilize the hull of the airship. The dimensioning and the cross section of the air duct depend on the type of drive such as, for example, internal combustion engines, propeller-turbines, atomic drive or other such drives.

FIG. 15 shows the structure of the rigid airship of the invention in greater detail. This airship is characterized in that the longitudinal girders 26 are located above or outwardly of the transverse girder framework 28 and are, therefrom, unable to stand out in relief with the latter on the outer skin. This reduces the air resistance or drag.

It has been found particularly appropriate to make the outer skin of sheet metal or of another such smooth and resistive material (such as beryllium). This helps to avoid a crushing of the skin at the very high speeds that can be obtained with the airships according to the invention.

As is further apparent from FIG. 15, the airship comprises two lounges 30 for passengers, crew and the like, which are connected to the interior of the airship by way of elevators 32. A longitudinal girder 34 extends from each lounge to the central air-duct frame 36. A similar pair of girders 38 extends obliquely upwardly so that the entire hull of the airship is extremely rigid and is able to oppose a maximum of air resistance to attacking external and internal forces.

FIGS. 16 to 21 illustrate the comparison of a rigid airship according to the invention with the known airship LZ–130, which had a content of 200,000 cu.m., a length of 245 meters and a diameter of 41.2 meters. The corresponding airship according to the invention is characterized by a height of 38 meters, a width of 57 meters and a length of 150 meters. It is readily apparent therefrom that the airship according to the invention has a comparatively low drag owing to its shape and small surface.

The invention is not limited to the embodiments shown and described herein, but can be modified in many different ways. For example, it is possible to combine the individual features of the various embodiments with those of other embodiments.

What is claimed is:

1. A dirigible airship comprising a rigid elongated hull, having a longitudinal axis and a cross-section perpendicular to the longitudinal axis which is defined by two equal half circles having between them a rectangle, the height of which is equal to the diameter of the half circles, the ratio of length to mainbreadth of the hull being substantially between 5:1 and 4:1, said hull having an approximately uniform cross section for a substantial portion of its entire longitudinal extent, a hollow framework rigidly connected with said hull and constituting a structural support therefor, said framework being arranged centrally in the center of resistance of the hull and extending in a longitudinal direction, said framework defining a longitudinal central duct, means in said duct for conveying air through the duct to drive the airship, a first gas cell adapted for receiving helium gas, a second gas cell adapted for receiving helium gas under low excess pressure, said second gas cell being in and surrounded by said first gas cell, means for pumping helium gas from the first gas cell into the second gas cell, a closable valve to allow gas to flow from the second gas cell into the first gas cell, an air cell spaced from said second cell and having at least partially deformable wall portions, said wall portions extending between the first gas cell and the air cell such that the second gas cell is separated from the air cell by the first gas cell, means for pumping air from the ambient atmosphere into the air cell, and a closable valve to allow air to flow from the air cell to the ambient atmosphere.

2. An airship as claimed in claim 1, comprising a third gas cell surrounding the second gas cell, and means to pump helium gas from the third gas cell into the second gas cell.

3. An airship as claimed in claim 1, wherein said hull has a front opening and a rear opening respectively in communication with the duct, said duct widening from a central portion thereof towards the front and the rear opening.

4. An airship as claimed in claim 1, wherein said hull has a front opening and a rear opening respectively in communication with the duct, said duct widening from a central portion thereof, the airship further comprising means at the rear opening of the body for controlling the direction of flow of air from the duct to maneuver the airship.

5. A rigid airship as claimed in claim 1, wherein said framework includes a casing directly supporting the hull and stiffening ribs extending from the framework defining the duct obliquely upwardly and downwardly to the casing.

6. An airship as claimed in claim 1, comprising independent control means for each particular gas-air cell combination.

References Cited by the Examiner

UNITED STATES PATENTS

| | | | |
|---|---|---|---|
| 984,076 | 2/11 | Cooper | 244—30 |
| 1,144,578 | 6/15 | Andersson | 244—96 |
| 1,160,095 | 11/15 | Boerner | 244—97 |
| 1,241,623 | 10/17 | Gusey | 244—30 |
| 1,426,370 | 8/22 | Finley | 244—97 |
| 1,835,260 | 12/31 | Barrera | 244—30 |
| 2,384,893 | 9/45 | Crook | 244—96 |
| 2,403,936 | 7/46 | Loback | 244—114 X |
| 2,475,786 | 7/49 | Jordan | 244—30 |

FERGUS S. MIDDLETON, *Primary Examiner.*

MILTON BUCHLER, *Examiner.*